United States Patent
Alam et al.

(10) Patent No.: US 10,470,015 B1
(45) Date of Patent: Nov. 5, 2019

(54) SYSTEM WITH AUTOMATIC CREATION OF APPLICATION-ORCHESTRATION WIDGETS FOR MULTI-APPLICATION INTERACTION

(71) Applicant: Citrix Systems, Inc., Fort Lauderdale, FL (US)

(72) Inventors: Abhishek Kumar Alam, Pompano Beach, FL (US); Padmashri Nonabur Krishnamurthy, North Lauderdale, FL (US); Smruthi Bhat, Pompano Beach, FL (US); Krishit Vimal Shah, Pompano Beach, FL (US); Jayasree Beera, Oakland Park, FL (US); Connor Bradley, Boca Raton, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/217,777

(22) Filed: Dec. 12, 2018

(51) Int. Cl.
H04W 4/50 (2018.01)
H04W 4/60 (2018.01)
H04M 1/725 (2006.01)

(52) U.S. Cl.
CPC ......... H04W 4/50 (2018.02); H04M 1/72525 (2013.01); H04W 4/60 (2018.02)

(58) Field of Classification Search
CPC ........... H04W 4/24; H04W 4/12; H04W 4/50
See application file for complete search history.

(56) References Cited

U.S. PATENT DOCUMENTS 7,100,195 B1 *   8/2006  Underwood ............ G06F 9/451
                                                                 726/2
2016/0210578 A1 *   7/2016  Raleigh ............ G06Q 10/06375

\* cited by examiner

*Primary Examiner* — Diane D Mizrahi
(74) *Attorney, Agent, or Firm* — BainwoodHuang

(57) ABSTRACT

In an enterprise computing system, in response to operation of a plurality of mobile applications on a mobile device, a system server receives application event data and stores the application event data as event entries in an event repository. Each event entry identifies mobile application activity for a respective mobile application running on the mobile device. In response to a trigger condition, a server performs activity evaluation operations on the event entries stored in the event repository to identify a frequent sequence of application events occurring for a subset of the mobile applications. Based on the frequent sequence of application events, the server creates a widget incorporating corresponding application control instructions effective to automatically replicate the frequent sequence of application events when the widget is deployed and invoked on the mobile device.

20 Claims, 4 Drawing Sheets

SYSTEM WITH AUTOMATIC CREATION OF APPLICATION-ORCHESTRATION WIDGETS FOR MULTI-APPLICATION INTERACTION

BACKGROUND

The present invention relates to the field of computing systems employing mobile device management, e.g., an enterprise computing system in which endpoint devices utilize approved applications managed by centralized management components of the system.

SUMMARY

A method is disclosed of providing widget-based orchestration of application execution in a mobile device. In particular, a system operates to automatically detect frequent sequences of user actions based on corresponding sequences of application events mined from an event repository, and identified sequences are use to create widgets capable of orchestrating multi-application operations to automatically re-create the identified sequences upon execution of the widgets.

More specifically, in the disclosed method, in response to operation of a plurality of mobile applications on the mobile device, a system server receives application event data and stores the application event data as event entries in an event repository. Each event entry identifies mobile application activity for a respective mobile application running on the mobile device. In response to a trigger condition, a server performs activity evaluation operations on the event entries stored in the event repository to identify a frequent sequence of application events occurring for a subset of the mobile applications. Based on the frequent sequence of application events, the server creates a widget incorporating corresponding application control instructions effective to automatically replicate the frequent sequence of application events when the widget is deployed and invoked on the mobile device.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

A method is disclosed that supports productivity of a mobile device user by simplifying and automating frequent, repetitive activities across enterprise applications executed on the mobile device. Generally the disclosed technique provides for automatic creation of a small, self-contained application (app) called a "widget" that is usable to re-create a sequence of activities/application interactions. The sequence can be replayed by invocation of the widget by a user according to enterprise rules. In some embodiments widget operation may be integrated with a voice assistant on the device. In other embodiments, the widgets may be extended to automatically send custom usage statistics/data from the device/applications to a remote analytics engine.

In some existing techniques, such as Workflow on iOS, require a user to manually create a sequence of actions. This is in contrast the present technique in which the mobile device and remote specialized servers (e.g., enterprise servers) co-operate to automatically create widgets that are usable to re-create frequent sequences of actions. The disclosed technique automatically identifies a mobile user's frequent multi-app interactions based on data mined from app interactions. The disclosed method can also leverage a Web single-sign-on (SSO) mechanism to seamlessly automate interactions across enterprise applications downloaded from the same enterprise store. The widget may also be shared via a remote device management server for use on other enrolled devices.

DESCRIPTION OF EMBODIMENTS

Figure 1:
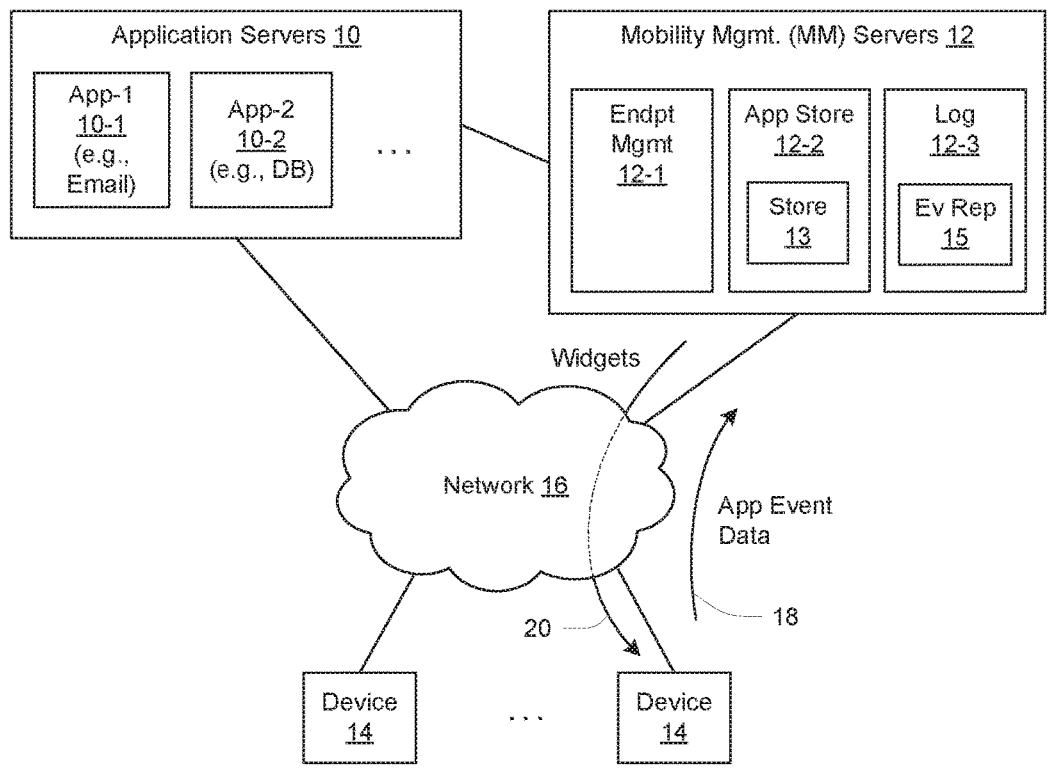
FIG. 1 is a block diagram of an enterprise computing system with automatic creation of application orchestration widgets.

FIG. 1 shows a distributed computing system including application servers 10, mobility management or MM servers 12, and endpoint devices (devices) 14, coupled together by one or more data communications networks (networks) 16. The servers 10, 12 and devices 14 are computerized devices executing respective software including system-level software (e.g., operating system, infrastructure management applications) and applications. Enterprise applications include server-side functionality as well as client- or device-side functionality. FIG. 1 shows the servers 10 as including a first server 10-1 for an application App-1 (e.g., email), and a second server 10-2 for another application App-2 (e.g., a database (DB) application). Details of device-side organization for example enterprise-level applications are given below.

The MM servers 12 collectively provide a variety of services and functions in support of the use of enterprise applications and other resources by the endpoint devices 14, which in general are mobile devices such as smart phones, tablet computers, laptop computers etc. Example functions are shown as residing in respective servers, i.e., an endpoint management (Endpt mgmt.) server 12-1 providing various functions related to the endpoint devices 14 as described more below; an application store (App Store) server 12-2 hosting a store 13 of applications made available for deployment to the endpoint devices 14; and a log server 12-2 providing for the collection and storing (in event repository 15) of application event logs as described more herein. It will be appreciated that in a given system there may be multiple servers providing respective functions as necessary (e.g., multiple endpoint management servers 12-1 collectively providing endpoint management for the entire system).

The system includes certain functionality described in detail below and shown at a high level in FIG. 1. In operation, the devices 14 perform certain self-monitoring that captures application events and communicates corresponding application event data 18 to the log server 12-3 for storing in the event repository 15. The endpoint management server 12-1 includes a process of periodically performing certain operations on application event data stored at the log server 12-3. This processing results in creation of small self-contained applications referred to as "widgets" 20, which are downloaded or otherwise provided to the endpoint devices 14 where they are executed to automate frequent activities that are represented in the application event data 18. This functionality enhances operation of the endpoint devices 14 and overall system.

Figure 2:
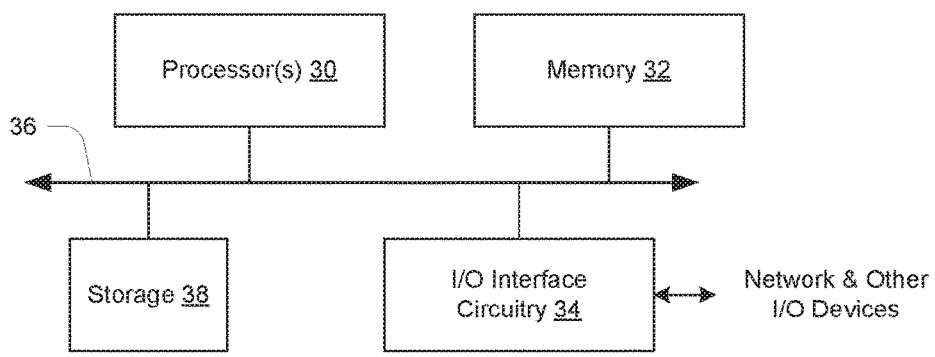
FIG. 2 is a block diagram of a computing device.

FIG. 2 shows an example configuration of a physical computer such as a server 10, 12 or endpoint device 14 from a computer hardware perspective. The hardware includes one or more processors 30, memory 32, and interface circuitry 34 interconnected by data interconnections 36 such as one or more high-speed data buses. The interface circuitry 34 provides a hardware connection to the network 16 (FIG. 1) and perhaps other external devices/connections (EXT DEVs). The processor(s) 30 with connected memory 32 may also be referred to as "processing circuitry" herein. There may also be local storage 38 such as a local-attached disk drive or Flash drive. In operation, the memory 32 stores data and instructions of system software (e.g., operating system) and one or more application programs which are executed by the processor(s) 30 to cause the hardware to function in a software-defined manner. Thus the computer hardware executing instructions of a certain application, for example, can be referred to as a corresponding circuit or component, and it will be understood that a collection of such circuits or components can all be realized and interact with each other as one or more sets of computer processing hardware executing different computer programs as generally known in the art. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

Figure 3:
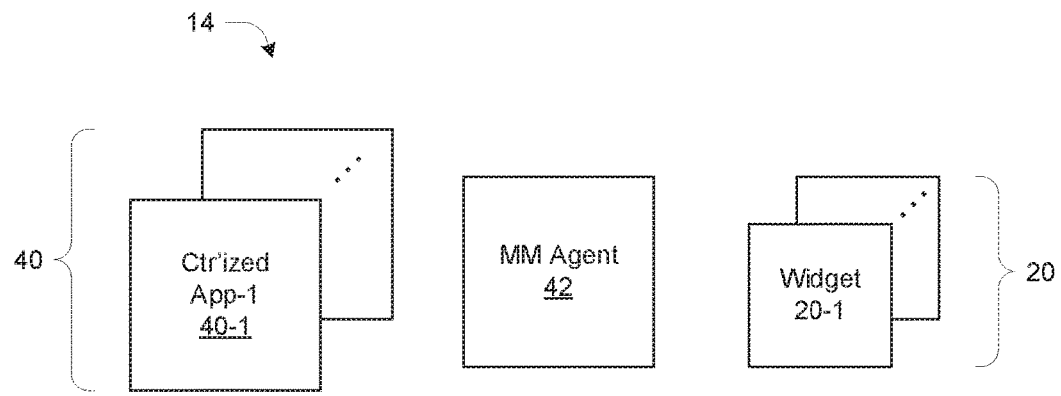
FIG. 3 is a schematic diagram of operating components of an endpoint device.

FIG. 3 shows an organization of an endpoint device 14 from a software perspective. It includes a plurality of containerized (Ctr'ized) applications 40, an example of which is shown as containerized App-1 40-1. It also includes a mobility management (MM) agent 42 and a plurality of widgets 20, an example of which is shown as widget 20-1. Each containerized application 40 contains the client-side (or device-side) functionality of an enterprise application (e.g., email, etc.) packaged or "wrapped" with additional functions, as described more below. The MM agent 42 provides device-side, general-purpose mobility management functionality, including for example the downloading and installation of containerized applications 40 and widgets 20 from the App store 12-2. The widgets 20 are described briefly above and more fully below.

Figure 4:
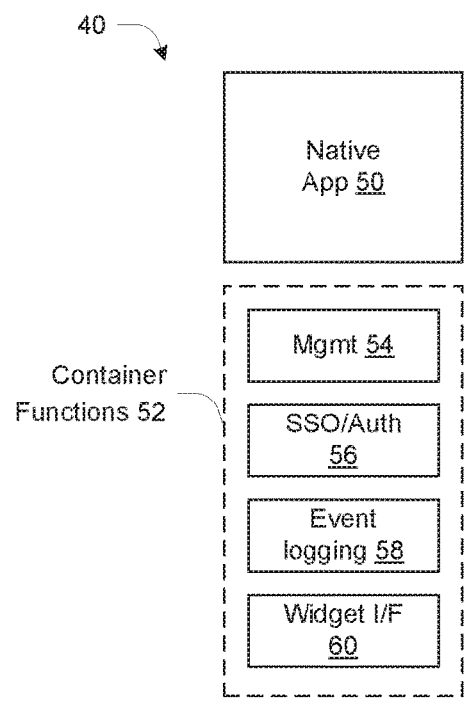
FIG. 4 is a schematic diagram of a containerized application structured for widget orchestration.

FIG. 4 shows the structure of a containerized application 40. It includes a respective native application 50 and a collection of container functions 52, including a management function 54, single-sign-on or other authentication (SSO/Auth) function 56, event logging function 58, and widget interface (I/F) 60. The native application 50 is the client-side executable application image as typically provided for conventional, non-containerized use, e.g., for installation on iOS® or Android® smart phone and having corresponding interfaces into the iOS or Android environment. The container functions 52 essentially modify the operating environment to support functionality of an enterprise IT system (such as the system shown in FIG. 1) in which the containerized application 40 is deployed.

In one embodiment, containerization may be realized using the Mobile Device Experience (MDX) toolkit available from Citrix Systems, Inc. The MDX Toolkit is an app container technology that enhances the mobile device experience by preparing apps for secure deployment with endpoint management by adding items such as the following to the apps:

Code for supporting mobile app management tasks, such as provisioning, custom authentication, per-app revocation, data containment policies, data encryption, and per-app virtual private networking Signed security certificates Policy information and other endpoint management settings Returning to FIG. 4, at a high level, the management function 54 provides an interface between the native application 50 and the endpoint management server 12-1, including certain widget-related functions as described more below. The SSO/Auth function 56 provides authentication-related functionality for the native application 50 operating in the specific enterprise system, including single-sign-on authentication. The event logging 58 captures application event data and communicates it to the log server 12-3 as described more below. The widget interface 60 enables an external component such as a widget 20 to invoke execution of the native application 50 in a targeted way to recreate certain sequences of operations, as also described below.

Figure 5:
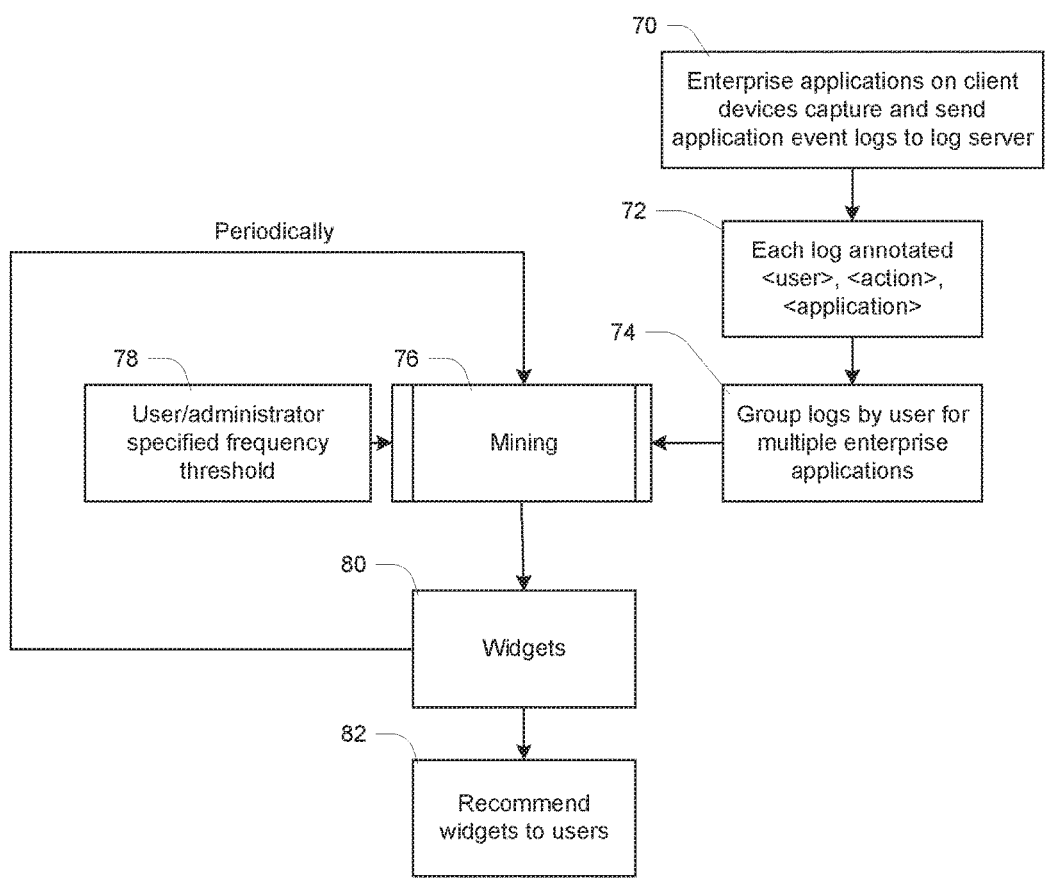
FIG. 5 is a schematic diagram for a process of collecting and communicating application events and creating widgets for replaying frequent sequences of events.

FIG. 5 illustrates aspects of system operation at a high level. Generally operation includes two separate processes: regular ongoing capture and logging of application events (steps 70-74) and a lower-frequency process of using the logs to generate widgets to automate sequences of user actions (steps 78-80).

At 70, the enterprise applications (containerized applications 40) on the client devices 14 capture and send application event logs to a log management server (log server 12-3). This capture and logging of event information is preferably continuous and ongoing, apart from mining and widget-creation described more below. Each containerized application 40 captures application events such as user swipes, clicks, gestures etc. and reports them as application events 18 (FIG. 1) for inclusion in mobile application logs at the log server 12-3. More specifically, the application events that are captured include lifecycle events such as opening, closing, minimizing, sending to background, etc. All containerized applications 40 belonging to the same enterprise app store 12-2 send these logs to the remote log server 12-3.

At 72, the logs are processed and annotated to establish a user—user action—application relationship. This processing is preferably performed by the event logging function 58 of each containerized application 40, such that the application events 18 that are provided to the log server 12-3 are expressed accordingly in the sending step 70 described above. As an example, an event may be reported as (User: User1; Action: Open; Application: Microsoft Outlook).

At 74, the log server 12-3 groups the logs by user for the different applications used by that user.

At 76, based on a frequency threshold specified by the user or enterprise store administrator at 78, the endpoint management server 12-1 mines the logs to identify a frequent sequence of user actions which exceed the frequency threshold, i.e., a sequence which is repeated as a sequence at least as often as the frequency threshold. Example sequences are given below. An example threshold might be once per day, once per week, etc. Techniques for mining of sequential patterns (sequences) from a collection of data are generally known.

At 80, once a sequence is identified, a widget 20 is created which can be used to replay the frequent sequence. The widget 20 includes application control instructions that can be applied to the containerized applications 40 via the respective widget interfaces 60 to cause the respective native applications 50 to perform the specified operations. Again, example are given below.

At 82, the widget is recommended to the user by the endpoint management server 12-1. It may be stored in the application store 12-2 and made visible to the endpoint device 14. The user can install and use the widget 20 to achieve a 1-click way of replaying/redoing a set of multi-application activities/interactions. Because all the containerized applications 40 belong to the same enterprise store 12-2, a single-sign-on (SSO) mechanism can be used to replay the multi-app interactions/activities seamlessly.

As shown, the operations 76-80 may be performed periodically, e.g., at regular intervals or in response to some other initiation event or trigger. In one example it may be repeated on the order of daily, but other periods may be preferred in other embodiments. It may also be performed on demand in some implementations.

The endpoint management server 12-1 may also make the widget 20 available to other endpoint devices 14 for use by other users. Depending on popularity or usage pattern of a widget 20, the endpoint management server 12-1 may recommend the widget 20 to other users of the same enterprise as well. Once saved on endpoint devices 14, widgets 20 can be scheduled to be replayed periodically or on demand.

During the mining process 76, the task of identifying a sequence as "frequent" is based on the frequency threshold specified by the enterprise store admin/user (shown at 78). This can be based on number of times in a week/month by a single user or a group of users belonging to the same enterprise store. Frequent sequences are respective series of user-app-actions statements. The containerization technology may support flip between multiple apps and iOS provides multi-app interaction simulation for use by developers in automated testing. We can combine these two to create specific statements in the widget.

Figure 6:
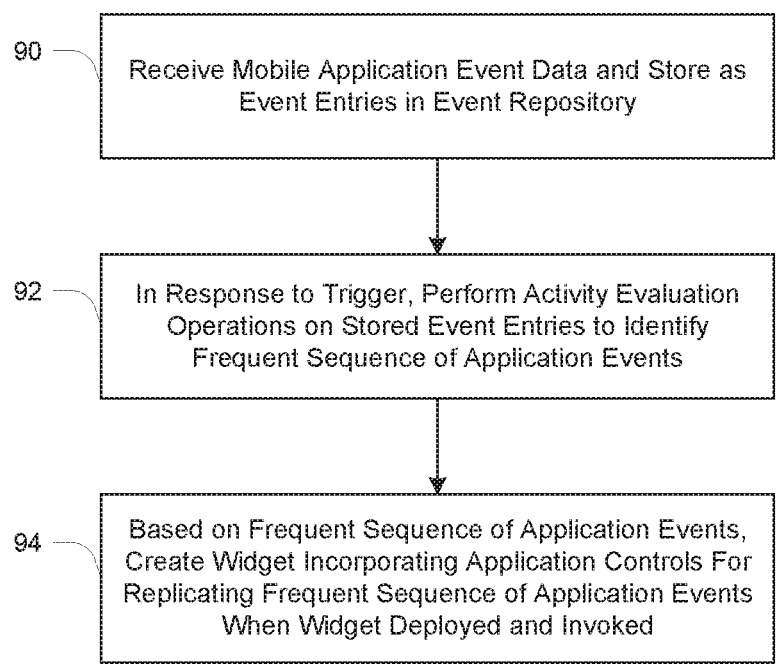
FIG. 6 is a flow diagram of operation of server equipment in connection with the process of FIG. 5.

FIG. 6 is a more detailed description of technical operations of the servers 12 in connection with the disclosed technique of generating a widget for deployment and use on a mobile device 14.

At 90, in response to operation of a plurality of mobile applications (e.g., 50) on a mobile device (e.g., 14), a server (e.g., log server 12-3) receives application event data (e.g., 18) and stores the application event data as event entries in an event repository residing in the server, which is external to the mobile device. Each event entry identifies mobile application activity for a respective mobile application running on the mobile device.

At 92, in response to a trigger condition, a server (e.g., endpoint management server 12-1) performs activity evaluation operations on the event entries stored in the event repository to identify a frequent sequence of application events occurring for a subset of the mobile applications.

At 94, based on the frequent sequence of application events, the server creates a widget (e.g., 20) incorporating corresponding application control instructions which are effective to automatically replicate the frequent sequence of application events when the widget is deployed and invoked on the mobile device.

As described above, once the widget is created with the application control instructions, it is made available for downloading and installation on the endpoint device, after which it is invoked by user action or programmatically. The control instructions invoke respective containerized applications 40 via the respective widget interfaces 60 to recreate corresponding application events, e.g., opening an application, performing some application function (such as browsing, selecting, reading, etc.), minimizing an application window, etc.

Use Cases

Two simple use cases of the disclosed technique are presented. In each of these, a user of an endpoint device 14 has work habits that include certain routines that result in frequent sequences of application events as described herein.

Example 1

At the start of the day, a user performs the following sequence of actions:
1. Check emails directed to them on their enterprise mail application
2. Check their calendar on enterprise mail application for the day and plan their day
3. Check top news items in their enterprise application
4. Check the weather for the day Example 2 (for User in a Mobile Management Environment)

1. Download secure application orchestrator agent from app store
2. Enroll to corporate store
3. Install required applications from store and authorize them to be managed applications The amount of cumulative time a user spends on such repeatable sequence of actions may be significant, and thus use of the disclosed technique may enhance user productivity. Thus the disclosed technique aims to provide a widget which automates such sets of actions across enterprise applications seamlessly, using techniques such as Web SSO as appropriate. The technique may also be integrated with a voice assistant/text-speech engine to generate an audio feedback of the actions as being performed under the widget-based orchestration.

While various embodiments of the invention have been particularly shown and described, it will be understood by those skilled in the art that various changes in form and details may be made therein without departing from the spirit and scope of the invention as defined by the appended claims.

What is claimed is:

1. A method of providing widget-based orchestration of multiple application execution in a mobile device, comprising:
   in response to operation of a plurality of mobile applications on the mobile device, receiving application event data and storing the application event data as event entries in an event repository residing in a server external to the mobile device, each event entry identifying mobile application activity for a respective mobile application running on the mobile device;
   in response to a trigger condition, performing activity evaluation operations on the event entries stored in the event repository to identify a frequent sequence of application events occurring for a subset of the mobile applications; and based on the frequent sequence of application events, creating a widget incorporating corresponding application control instructions effective to automatically replicate the frequent sequence of application events when the widget is deployed and invoked on the mobile device.

2. The method of claim 1, wherein the mobile applications are containerized applications, each containerized application including a native mobile application and a set of container functions configured and operative to specifically integrate the native mobile application into a distributed computing system.

3. The method of claim 2, wherein the container functions include a mobile management function, an authentication function, an event logging function, and a widget interface, the mobile management function providing a management interface to the mobile device from a remote mobile management server, the authentication function implementing an authentication method common across the distributed computing system, the event logging function being operative to capture the application event data and communicate the application event data to the server for storing in the event repository; the widget interface providing for invocation of functions of the native application by the application control instructions of the widget.

4. The method of claim 2, wherein the container functions include an event logging function being operative to create annotated logs of application events for communicating to the server as the application event data, each annotated log being structured as a triplet including an identification of a user, an identification of an application, and an identification of an application event occurring during execution of the application by the user.

5. The method of claim 1, wherein the application events are user-initiated events and the frequent sequence of application events correspond to frequent sequences of user interactions with the mobile applications.

6. The method of claim 1, wherein the application events are application lifecycle events including launching an application, bringing an application window into focus, sending an application window to background, and closing an application.

7. The method of claim 1, wherein the server performing the receiving and storing is a log server of a set of mobile management servers in an enterprise computing system, and wherein the performing and creating are executed by an endpoint management server included in the set of mobile management servers.

8. The method of claim 7, wherein the set of mobile management servers further include an application store server operative to store the widget for downloading to the mobile device for installation and use.

9. The method of claim 8, wherein the application store server also makes the stored widget available for downloading to other mobile devices based on identifying the frequent sequence of application events in application event data of other users interacting with the same set of applications.

10. The method of claim 1, wherein identifying the frequent sequence is based on a frequency threshold specified by the user or an administrator, the frequent sequence occurring at a rate at least as great as the specified frequency threshold.

11. Server equipment comprising processing circuitry with memory storing a set of computer program instructions executed by the processing circuitry to cause the server equipment to perform a method of providing widget-based orchestration of multiple application execution in a mobile device, the method including:

in response to operation of a plurality of mobile applications on the mobile device, receive application event data and storing the application event data as event entries in an event repository residing in a server external to the mobile device, each event entry identifying mobile application activity for a respective mobile application running on the mobile device;

in response to a trigger condition, performing activity evaluation operations on the event entries stored in the event repository to identify a frequent sequence of application events occurring for a subset of the mobile applications; and based on the frequent sequence of application events, creating a widget incorporating corresponding application control instructions effective to automatically replicate the frequent sequence of application events when the widget is deployed and invoked on the mobile device.

12. The server equipment of claim 11, wherein the mobile applications are containerized applications, each containerized application including a native mobile application and a set of container functions configured and operative to specifically integrate the native mobile application into a distributed computing system.

13. The server equipment of claim 12, wherein the container functions include a mobile management function, an authentication function, an event logging function, and a widget interface, the mobile management function providing a management interface to the mobile device from a remote mobile management server, the authentication function implementing an authentication method common across the distributed computing system, the event logging function being operative to capture the application event data and communicate the application event data to the server for storing in the event repository; the widget interface providing for invocation of functions of the native application by the application control instructions of the widget.

14. The server equipment of claim 12, wherein the container functions include an event logging function being operative to create annotated logs of application events for communicating to the server as the application event data, each annotated log being structured as a triplet including an identification of a user, an identification of an application, and an identification of an application event occurring during execution of the application by the user.

15. The server equipment of claim 11, wherein the application events are user-initiated events and the frequent sequence of application events correspond to frequent sequences of user interactions with the mobile applications.

16. The server equipment of claim 11, wherein the application events are application lifecycle events including launching an application, bringing an application window into focus, sending an application window to background, and closing an application.

17. The server equipment of claim 11, wherein the server equipment includes a log server and an endpoint management server of a set of mobile management servers in an enterprise computing system, the log server executing the receiving and storing, and the endpoint management server executing the performing and creating.

18. The server equipment of claim 17 wherein the set of mobile management servers further include an application store server operative to store the widget for downloading to the mobile device for installation and use.

19. The server equipment of claim 18, wherein the application store server also makes the stored widget available for downloading to other mobile devices based on identifying the frequent sequence of application events in application event data of other users interacting with the same set of applications.

20. The server equipment of claim 11, wherein identifying the frequent sequence is based on a frequency threshold specified by the user or an administrator, the frequent sequence occurring at a rate at least as great as the specified frequency threshold.

* * * * *